Figure 1:
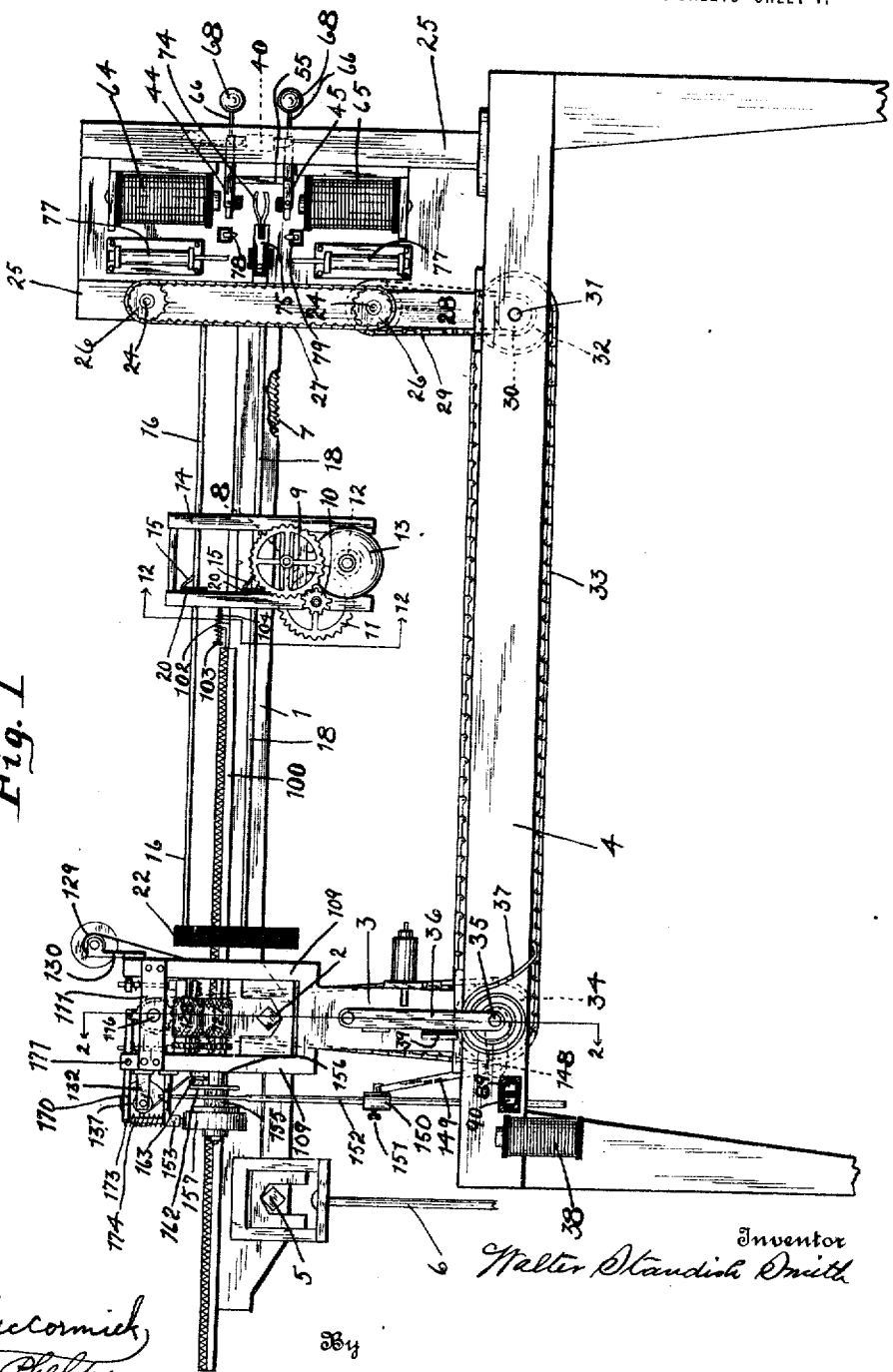

W. S. SMITH.
SCALE.
APPLICATION FILED JULY 6, 1915.

1,365,799.

Patented Jan. 18, 1921.
6 SHEETS—SHEET 1.

Witnesses
R. M. McCormick
A. L. Phelps

Inventor
Walter Standish Smith
By
C. C. Shepherd
Attorney

W. S. SMITH.
SCALE.
APPLICATION FILED JULY 6, 1915.
1,365,799.
Patented Jan. 18, 1921.
6 SHEETS—SHEET 3.
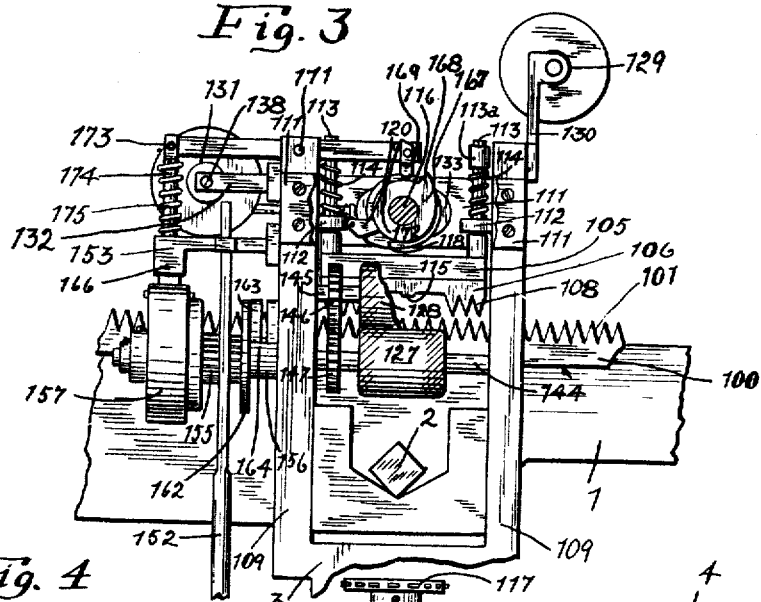
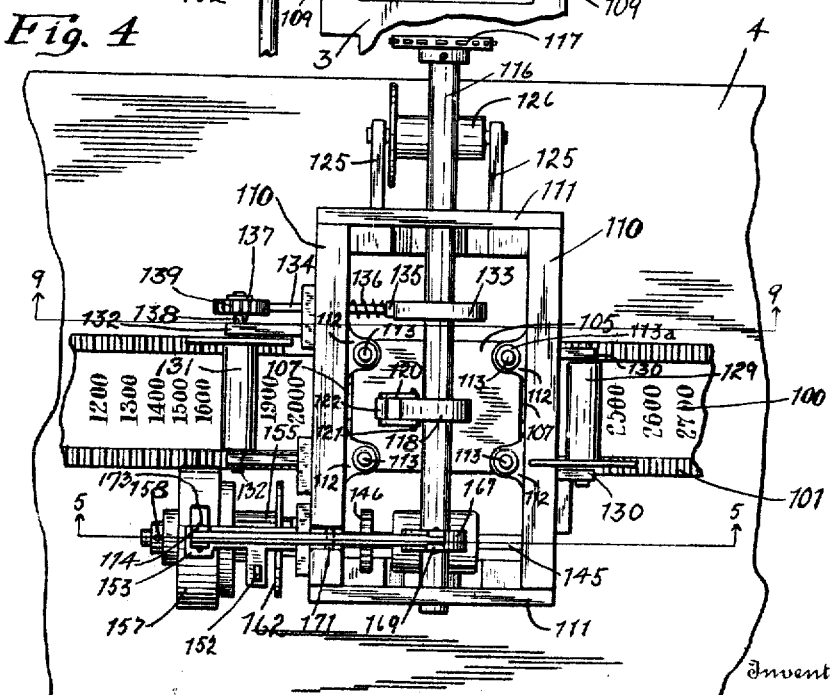
Witnesses
R. M. McCormick
A. L. Phelps
Inventor
Walter Standish Smith
By C. C. Shepherd Attorney

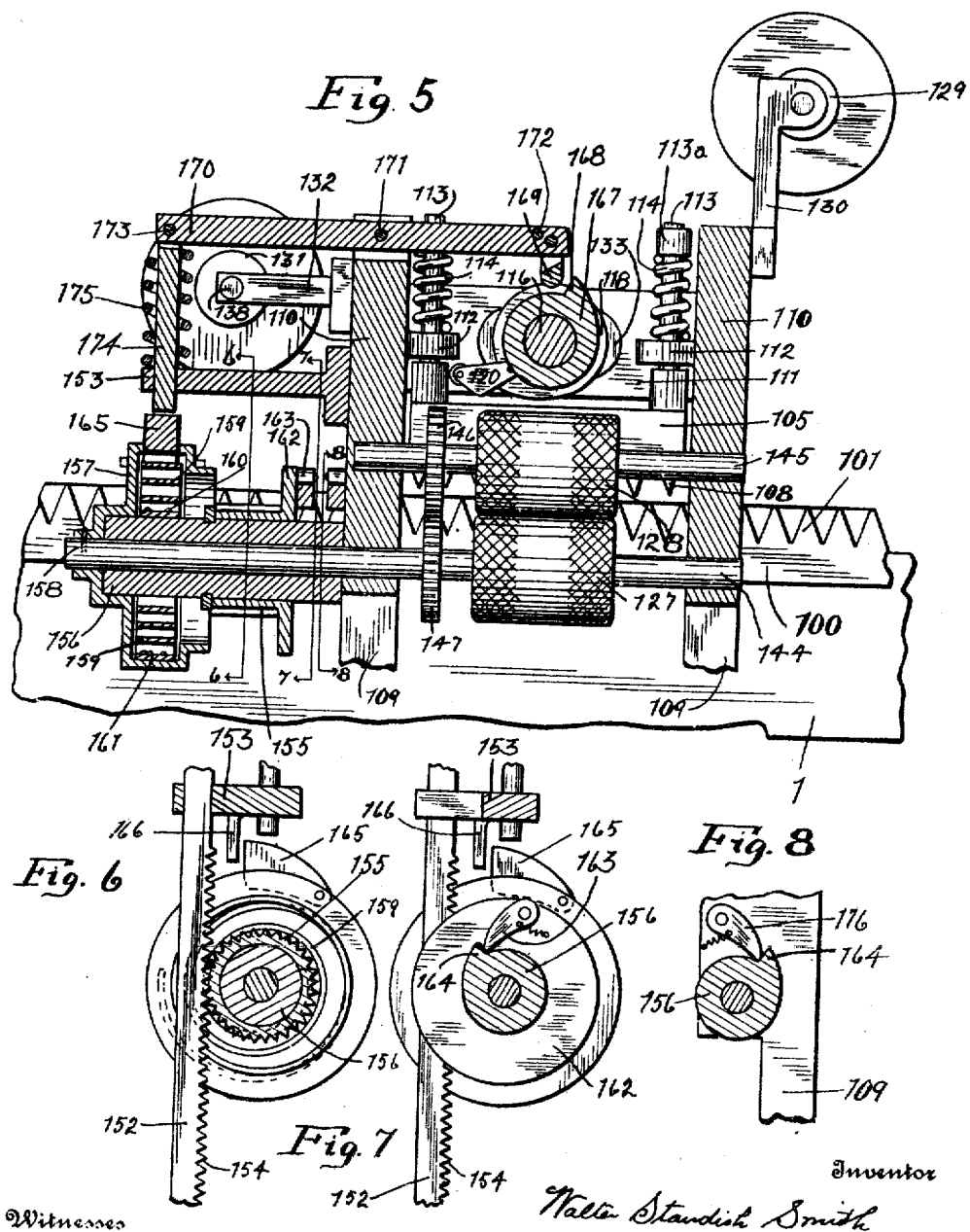

W. S. SMITH.
SCALE.
APPLICATION FILED JULY 6, 1915.
1,365,799.
Patented Jan. 18, 1921.
6 SHEETS—SHEET 5.
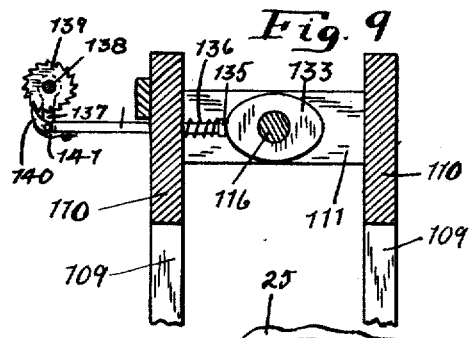
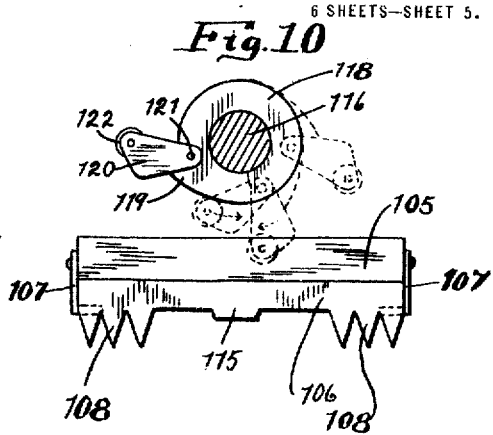
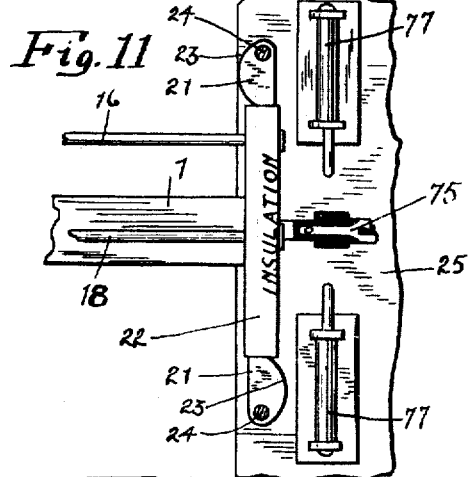
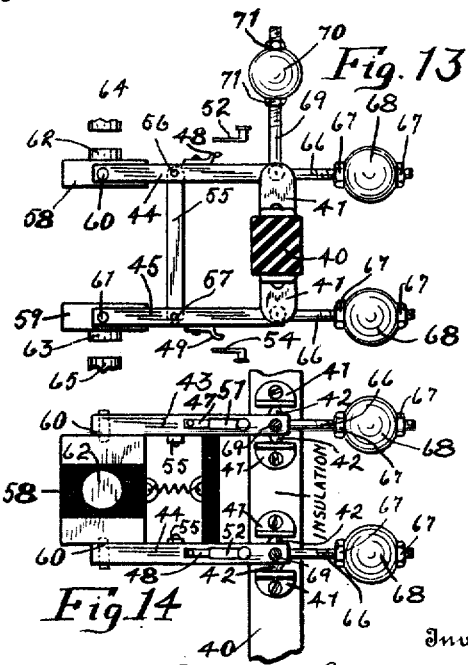
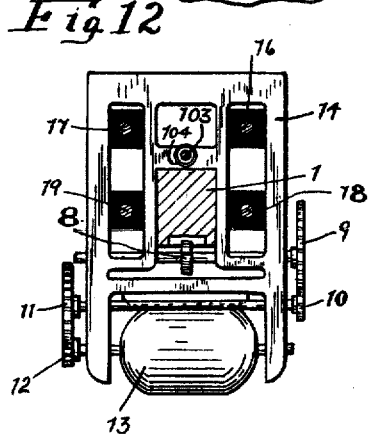
Witnesses
R. M. McCormick,
A. L. Phelps
Inventor
Walter Standish Smith
By
C. C. Shepherd
Attorney

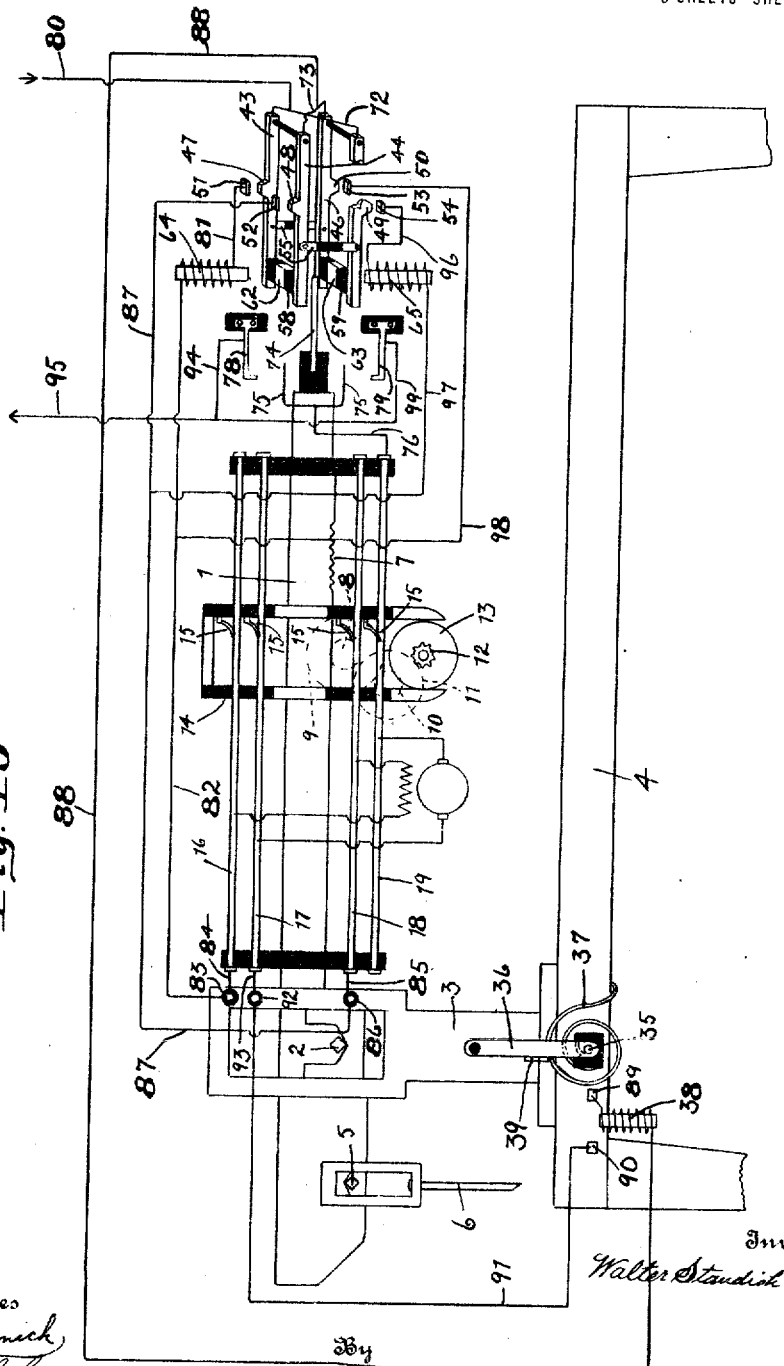

UNITED STATES PATENT OFFICE.

WALTER STANDISH SMITH, OF COLUMBUS, OHIO, ASSIGNOR OF ONE-HALF TO LEWIS R. DRAKE, OF COLUMBUS, OHIO.

SCALE.

1,365,799. Specification of Letters Patent. Patented Jan. 18, 1921.

Application filed July 6, 1915. Serial No. 38,312.

*To all whom it may concern:*

Be it known that I, WALTER STANDISH SMITH, a citizen of the United States, residing at Columbus, in the county of Franklin and State of Ohio, have invented certain new and useful Improvements in Scales, of which the following is a specification.

This invention relates to scales and is preferably designed to automatically accomplish the weighing of any one or a series of weights applied to the same. My invention is particularly designed to accomplish these weighing actions with great rapidity and also with the necessary degree of accuracy. One use to which my invention may be put, is in weighing railroad cars as they are shunted singly on to and over the weighing platform. It is to be understood that my scale is applicable to a great many industries, the above manner of its use being one of the hardest tests to which a scale may be put, since the weights are taken and recorded during the continuous movement of the cars.

The main object of my invention resides in the provision of a structure whereby the balancing weight may be recorded in any desired manner at the instant that the beam has attained a state of equilibrium. By way of explanation, it may be stated that any free vibratory scale beam is in a state of equilibrium when the counterpoise has reached a point exactly balancing the applied weight or, in other words, where the moment of the counterpoise equals the moment of the applied weight. When this condition comes to pass, it makes no difference what the angularity of the beam may be, since it is in a state of equilibrium for all positions within the points that it is freely vibratable. It, therefore, follows that when the counterpoise has moved to the exact point to just balance the applied weight, the beam may be made to assume any position of inclination and be in equilibrium. It is, therefore, one of the purposes of the present invention to record the weight at the instant that the equilibration point is reached and not to wait until the beam vibrates back and forth to assume a horizontal balancing position.

A further object of my invention resides in the provision of a structure whereby the weight is recorded at the time the beam reaches a state of equilibrium without waiting for either the beam or the counterpoise or both coming to rest. As an illustration, it may be stated that my invention contemplates a structure whereby the counterpoise is moved along the beam until it balances the applied weight. Very slight continued movement will then over-balance the beam to cause it to tilt and it is at this point that the weight is recorded before the counterpoise is permitted to continue its movement or to drift on, it being not necessary that the counterpoise be shifted back and forth until the point is reached where the beam will assume an unrestrained horizontal balanced position.

Still a further object of my invention resides in the combination of a recorder mechanism of any desired type operating in conjunction with the counterpoise, and to agree with what has been said before, a yielding connection is desirably provided between the connecting mechanism, between the counterpoise and the recording mechanism and the counterpoise itself. This yielding connection is provided in order that the connecting mechanism may move along with the counterpoise and then stop when the equilibration point is reached, without necessarily instantly stopping the counterpoise in its movement.

Another object of the present invention resides in a structure so arranged that the recording mechanism is itself actuated by the tilting of the beam, this being preferably accomplished at the time that the beam starts its swinging movement after having been placed in a state of even balance with the applied weight.

Still a further object of my invention takes the form of a novel type of switch element in combination with the vibratory beam, for governing the direction at which the motor controlling counterpoise is to rotate, to thereby move the counterpoise in the proper direction.

Another object of the present invention resides in a structure for recording the weight or any succession of weights as they are applied to the scale. In the present instance, this recording mechanism takes the form of a printer structure, but my invention in its broad aspect is not in any sense limited to a printing mechanism, as any other type of recording mechanism which will either give a permanent record or one which may be displayed from time to time, will suffice.

Figure 2:
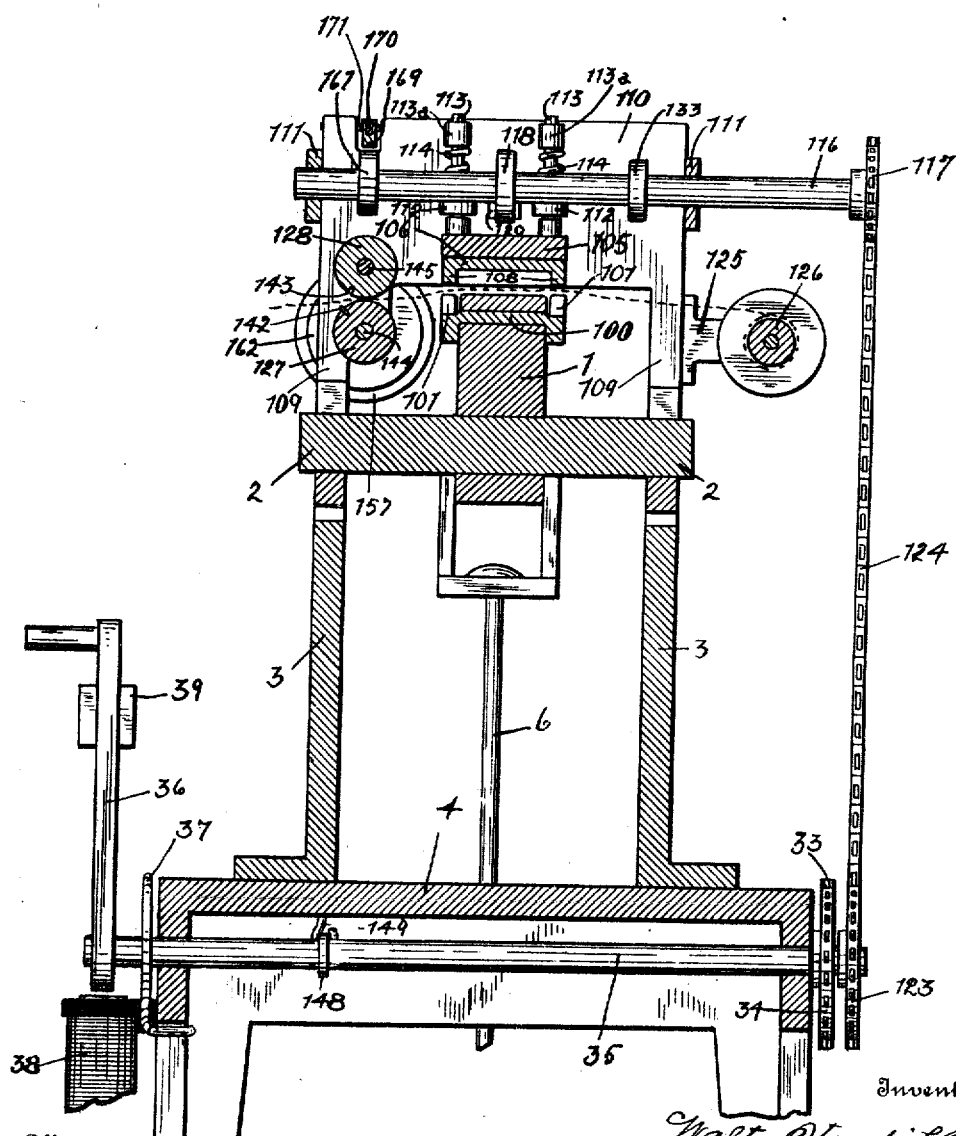

The preferred embodiment of my invention is shown in the accompanying sheets of drawings, in which similar characters of reference designate corresponding parts, and in which:

Figure 1 is a side elevation of my assembled scale beam, the weighing platform, etc. being omitted, Fig. 2 is an enlarged cross section taken on line 2—2 of Fig. 1, Fig. 3 is an enlarged side view of the printer mechanism, the view being taken in a similar position to that shown in Fig. 1, Fig. 4 is a top plan view of the structure shown in Fig. 3, Fig. 5 is an enlarged section taken on line 5—5 of Fig. 4, Figs. 6, 7 and 8 are cross sections taken on lines 6—6, 7—7 and 8—8 respectively of Fig. 5 and looking in the direction of the arrows, Fig. 9 is a section taken on line 9—9 of Fig. 4 and looking in the direction of the arrows, Fig. 10 is a detail view of the cam structure used in operating the print foot, Fig. 11 is a detail view of the free end of the scale beam showing the mechanism for locking the same in neutral position, Fig. 12 is a cross section taken on line 12—12 of Fig. 1, Fig. 13 is a side elevation of the switch element used in connection with the free end of the scale beam for governing the direction of motor rotation, Fig. 14 is a top plan view of the structure shown in Fig. 13, and, Fig. 15 is a diagrammatic view showing the wiring arrangement used in connection with my scale.

In these several drawings, there is shown a scale beam, this beam being designated by the numeral 1 and shown as pivotally supported at 2 upon supporting standards 3 carried by a table structure designated generally by the reference numeral 4. The rear end of this scale beam is provided with a pivot structure 5 to which the platform rod 6 is connected, while its under surface is provided with spur teeth such as are shown at 7. These spur teeth are designed to mesh with a pinion 8 forming one member of a train of gearing 9, 10, 11 and 12, this latter pinion 12 being mounted upon the armature shaft of a motor 13, this motor forming a portion of the counterpoise structure and being rigidly mounted in a general framework designated 14. This general framework also carries a plurality of contacts designated 15, these contacts coöperating with trolleys 16, 17, 18 and 19 whereby current is fed to the armature and field of the motor 13. It will be noted that the motor supporting framework 14 is slidably mounted upon the beam 1 and also that the contacts 15 have sliding contact with their respective trolleys, these contacts being themselves mounted upon blocks of insulation 20 and being connected to the motor by any desired type of wiring.

From the description thus far given, it will be apparent that the motor counterpoise is moved back and forth on the scale beam by its geared engagement with the gear teeth 7 on the underside of the beam and that current is supplied this motor by means of the trolleys 16, 17, 18 and 19.

The beam itself is always maintained in a locked neutral position when not in use, this locking structure comprising the eccentrically mounted locking blocks 21 shown particularly in Figs. 1 and 11. These locking blocks are spaced apart a distance to engage one of the trolley insulator supports 22 when in the position shown in Fig. 11, these blocks themselves being provided with one curved face 23 and being mounted upon shafts 24 rotatably carried in the framework 25 carried by the table 4 for supporting the reversing switch structure to be presently described. The outer end of each of the shafts 24 is provided with a sprocket 26 over which an endless chain 27 passes, the lowermost of the shafts 24 being provided with a second sprocket designated 28. Over this latter sprocket there passes an endless chain 29 also passing over a second sprocket 30 carried upon a shaft 31, this latter shaft being rotatably mounted in the table structure 4. This shaft 31 further carries a larger sprocket 32 over which the chain 33 passes, this chain in turn passing over a sprocket 34 carried upon a shaft 35 rotatably mounted in the right hand end of the table 4 and upon which the operating crank 36 is mounted. The handle 36 is controlled by means of a torsion spring 37 one end of which is rigidly secured to the shaft 35 and the opposite end of which is held immovable by engagement with the underside of the table 4, this spring normally tending to move the handle to the position shown in Figs. 1 and 15. The handle 36 is held in its other position under the influence of the magnet 38 coöperating with the handle armature 39 when the current is permitted to pass through this magnet, all as will be presently described.

The unlocking and locking operation is as follows: When the handle 36 is moved toward the left, the shaft 31 is turned through a corresponding arc by means of the sprockets 32 and 34 and the chain 33. Then by means of the sprockets 28 and 30 and the chain 29 and the sprockets 26 and the chain 27, the shafts 24 are also moved through a corresponding arc, thereby turning the locking blocks 21 to a position substantially at right angles to that shown in Fig. 1. Thus, the beam is free to vibrate, but upon the release of the handle 36 by the breaking of the current through the magnet 38, the spring 37 will move the handle to the position shown in Figs. 1 and 14, thereby again moving the locking blocks 23 so that one of their curved edges comes into engagement with the insulator support 22 to gradually move it to locking position, then the two locking blocks coöperate to hold the spring in this position.

I will now describe the mechanism for governing the direction at which the motor controlling the counterpoise rotates. This mechanism comprises a double throw pole switch of peculiar construction, being shown diagrammatically in Fig. 15 and shown in detail in Figs. 1, 13 and 14. Between the two side pieces forming the general framework 25, there is mounted a block of insulating material 40, this insulator carrying two sets of upwardly and downwardly extending brackets 41 arranged in two pairs on each of its upper and lower surfaces. The brackets 41 forming each pair are slightly spaced from each other and pivotally receive between them the pointed bearing members 42, each of these bearing members being rigidly mounted in connection with one of the forwardly extending arms designated 43, 44, 45 and 46. Each of these arms also carries a contact, these contacts being numbered 47, 48, 49 and 50, these latter contacts coöperating with complemental contacts 51, 52, 53 and 54, all of the arms of the contacts being more clearly shown in the diagrammatic view as illustrated in Fig. 15. The upper and lower pairs of arms 43 and 44 and 45 and 46 are pivotally connected together by an additional means represented as a tie rod shown at 55, this tie rod being pivotally connected at 56 and 57. The forward ends of each pair of arms also pivotally carry an armature support in the nature of a block of insulation shown at 58 and 59, these armature supports being pivoted respectively at 60 and 61 and each carrying a metallic armature 62 and 63 for coöperation with magnets shown at 64 and 65. The entire switch structure is pivoted as previously stated, about the bearing members 43 and in order to equalize the weight on both sides of these bearing members, I have provided each of the arms 43, 44, 45 and 46 with a rearwardly extending rod 66, the end of this rod being threaded to accommodate adjusting nuts 67 between which a weight 68 is carried. These weights are adjustable back and forth upon their rods until the switch as a whole, or each of the rods 43, 44, 45 and 46 combined are evenly balanced about their pivot points. With this even balance, it follows that if the switch member is moved to a position of inclination, so that any set of coöperating contacts are in engagement, the switch as a whole will remain in this position due to its state of equilibrium. However, it is desirable to provide a slight additional weight to more positively hold the switch in either its upwardly or downwardly inclined position. To accomplish this, I provide the pair of top arms, these designated 43 and 44 with an upstanding rod 69, these rods being so arranged that they are in true vertical position when each of the arms is in a true horizontal position. The upper end of each of the rods 69 is provided with a weight 70 adjustably held in position by means of the nuts 71. Thus, when the arms forming the switch have been moved to assume a position of inclination either up or down, the weights 70 and their supporting rods will have been moved to assume an inclined position with respect to the vertical. This weight will then have a tendency to hold the switch arms in their inclined position and in this way the exact even balance caused by the weights 68 is destroyed. It will also be noted that these weights 70 are effective no matter whether the inclination of the switch arms is up or down. Now, referring to Fig. 15, it will be noted that the arms 43 and 45 are electrically connected by means of a wire 72, while the arms 44 and 46 are also electrically connected by means of a wire 73. This arrangement serves to reverse the direction of rotation of the motor, as will be presently pointed out, when the switch is moved from one position of inclination to the other.

This switch is actuated by the tilting of the scale beam 1 in its normal oscillating movement when a weight has been applied thereto. This shifting is preferably accomplished by the use of a spring buffer element shown particularly in Fig. 1 and designated 74, this buffer element being mounted in a block of insulation directly on the end of the scale beam. There is also mounted on the end of this scale beam a contactor element designated 75, this contactor element being in electrical connection with the trolley 19 by means of the wire 76 as clearly shown in Fig. 15. The general framework 25 supporting the switch mechanism also carries a pair of buffers 77 against which the end of the scale beam may strike when it is being tilted, these buffers being provided to take up some of the shock caused by too rapid a vibration. In addition to the buffer 77, this general supporting framework 25 also carries a pair of electrical contacts 78 and 79 designed to coöperate with the contact 75 carried on the end of the scale beam.

The manner of governing the motor by means of the scale beam is as follows: Current enters from one of the mains 80, this wire connecting, as indicated, with the wire 72. Assuming the scale beam to have been tilted upwardly, the buffer 74 will have engaged the armature support 58 and thereby move the switch element to also assume an upwardly inclined position, this position being maintained under the influence of the weights 70. This, therefore, provides an outlet for the current from the arm 43 since the contacts 47 and 51 are in engagement. From this point the current enters the wire 81 and thereby energizes the magnet 64, whereupon the switch element is further held against charge or against oscillation such as might be caused by an external shock or jar, since this magnet coöperates with the armature 58. From here the current enters the wire 82, binding post 83 on the scale standard, wire 84, and trolley 16, passing through the field of the motor as is shown diagrammatically and then passes out of the field through the trolley 18, into the wire 85, binding post 86, wire 87, from where it enters a contact 52 and then the contact 48 carried by the switch arm 44. From here the current enters the cross wire 73 and its only outlet is the wire 88. This wire 88 leads to the magnet 38 and since it is necessary that the handle 36 be moved to assume a horizontal position to unlock the scale beam, the current enters the contact 89 through the handle 36 which serves as a switch arm bridging the gap between the two contacts 89 and 90 and then passes through a wire 91 upon a post 92, wire 93 and trolley 17. From this point, it passes through the armature of the motor and enters the trolley 19. Here it seeks its outlet through the wire 76 on the right hand end of the trolley and into the contact 75 carried by the end of the scale beam. Since this scale beam is in tilted position this contact 75 is in engagement with the contact 78 and consequently the current passes through these contacts and out through the wire 94 and into the return main 95. As soon as the counterpoise has moved to a position on the beam 1 very slightly overbalancing this beam, it will tilt and consequently the electric circuit will be broken by the disengagement of the two contacts 75 and 78. This will release the handle 36 by the deënergization of the magnet 38, the torsion spring 37 forcing the handle to assume an upright position. The movement of the handle to this position locks the scale beam in its neutral position in the manner as has been already described. By mechanism still to be described, the weight is recorded at the instant that the contact is broken by means of the tilting of the scale beam. Should the scale beam have been moved to the opposite inclined position or, in other words, inclined downwardly, the reversing switch will also have been moved to a downwardly inclined position, thus bringing the contacts 49 and 50 into engagement with their complemental contacts 54 and 53 respectively. This will then permit the current to flow from the main 80 through the wire 72 into the arm 45, through the contacts 49 and 53 into a wire 96. Here the current enters the magnet 65 which operates in the same manner as described in connection with the magnet 64. The current continuing in its passage through the wires 97 and 87 into the binding post 86, wire 85, trolley 18 and then through the field of the motor in a direction opposite to that described when the beam is tilted in an upwardly inclined position. The current then leaves the field of the motor by way of the trolley 16, wire 84, binding post 83, wire 82 and since it cannot pass around the magnet 64 because of the break between the contacts 51 and 47, it enters the wire 98 through the contacts 53 and 50, wires 73 and 88, magnet 38, contact 89, handle switch 36, contact 90, wire 91, trolley 17 through the armature of the motor in the same direction as previously related, when the beam is tilted in the opposite inclined position, through the trolley 19, wire 76, scale beam contact 75, contact 79, wire 99 and out through the return lead 95. In this manner, the electric circuit is completed each time the handle 36 is moved to bridge the gap between the contacts 89 and 90, no matter what direction of inclination the beam may assume. It will, therefore, be apparent that the electric circuit is broken by the tilting of the beam toward horizontal position, this tilting then causing the release of the handle 36 by the deënergization of the magnet 38 to securely lock the beam in its neutral horizontal position and in position for the next succeeding weight.

Mechanism for recording the weights and the connection between this recording mechanism and a movable counterpoise is as follows: Reference particularly to Figs. 1, 2 and 3 will disclose that the upper surface of the scale beam slidably carries a type bar 100, this type bar being provided on its upper surface with the desired numerals indicating correct weights for different positions and also being provided along its two upper longitudinal edges with a series of V-shaped teeth 101. The end of the type bar toward the counterpoise is provided with an outwardly projecting angular bracket 102. The short leg of this angular bracket is apertured to admit of the passing of a bolt 103 therethrough, this bolt being rigidly attached to the framework forming the motor counterpoise. Springs 104 are provided and so arranged as to lie on either side of the short leg of the bracket 102, one of them being between the counterpoise of this bracket, while the other is between the bolt head and the bracket. The provision of these springs and of this particular connection is that the type bar may be instantly clamped into holding relation with the scale beam and in order to render it possible that the counterpoise is not also instantly stopped, these springs are provided to establish what may be termed a yielding connection whereby this counterpoise is permitted to drift on to a slight extent against the tension of the coil spring 104.

The printer mechanism includes a printer foot formed in two parts, this printer foot being formed in detail in Fig. 2 and the two parts being numbered 105 and 106. The two parts 105 and 106 are held together by means of the L-shaped springs 107. These springs are provided for a purpose to be presently described. It will also be noted that the section 106 carries a series of depending V-shaped teeth 108, these teeth being designed to coöperate with the teeth 101 on the type bar. The printer foot itself is carried in a framework formed of four vertically extending legs 109 forming the upper ends of the standards 3, the upper ends of these legs 109 being also joined in a direction at right angles to the view shown in Figs. 1 and 3, by means of the cross piece 110 and being joined in the same plane as the plane of Fig. 1 by means of the cross piece 111. Each of the cross pieces 110 is provided with a pair of outstanding pierced ears 112 through which slide rods 113 pass. These slide rods are also provided with coil springs 114, these springs abutting against the ears 112 at one end and against collars 113ª carried on their upper ends. In order to render the printer foot operative, it is necessary that it should be moved downwardly into clamping engagement with the type bar so that the boss 115 carried by its under surface, will come into rigid engagement with the type on the upper side of the type bar, it being understood that suitable tickets or paper are placed between the printer foot and the type. In order to accomplish this up and down movement, I have rotatably journaled a shaft 116 between the cross pieces 111, the outside end of this shaft being provided with a sprocket wheel 117 and its center portion being provided with a cam 118 shown in detail in Fig. 10. This cam is formed to be concentric with the shaft 116 through the major portion of its surface, with the exception of the nose portion 119. This cam also pivotally carries a hammer member 120, the same being pivoted to the cam as shown at 121 and being so formed as to strike against the nose portion to limit its movement in one direction and to be free to move in an opposite direction. This hammer also carries a roller 122 at its lower end.

As has been already related, the scale is set in operation by moving the handle 36 to a position of ninety degrees to that shown in Fig. 1. This will also cause a turning of its supporting shaft 35 and it may now be pointed out that this shaft 35 also carries a sprocket 123 as is particularly shown in Fig. 2, this sprocket 123 being connected by means of the chain 124 with the sprocket 117 on the shaft 116. Therefore, movement of the handle 36 through ninety degrees causes the rotation of the shaft 116 through a somewhat greater arc and this rotation in turn rotates the cam 118. This direction of turn rotates the cam 118. This direction of rotation moves the hammer 120 away from the nose portion 119 and consequently the printer body is not operated and as long as the handle 36 is down the hammer 120 is in approximately the position shown in dotted outline in Fig. 10. When the handle 36 is released, the shaft 116 moves in a reverse direction and consequently the hammer 120 is brought into engagement with the member 105 forming the printer foot and since this hammer cannot turn about its pivot point because of its engagement with the nose 119, this printer foot is moved downwardly against the tension of the springs 114. This downward movement brings the teeth 108 of the printer foot into engagement with the teeth 101 on the type bar and since the printer foot is immovable lengthwise on the beam, the type bar is stopped in its movement. This downward movement of the printer foot is also very rapid when compared with the forward movement of the type bar, and, therefore, it must appear that the two sets of teeth 101 and 108 will not always be in proper alinement when the printer foot is operated, meaning by this that one tooth may be offset slightly with regard to the other tooth. To overcome the tendency of moving the type bar either forwardly or backwardly to permit the downward movement of the printer foot, I have made this printer foot in two sections, these sections being designated 105 and 106. Thus, if the two teeth 101 and 108 are not in perfect alinement when the printer foot is operated, the lower section 106 may be shifted longitudinally on the under surface of the portion 105 because of the yielding nature of the holding springs 107. In this way an impression from the type bar is obtained, the present drawings illustrating a manner for forming tickets and also of keeping a record tape. Fig. 2 shows the supporting framework as carrying a pair of outstanding brackets 125 between which a feed roll 126 is mounted, it being this feed roll which is provided with the desired paper tape. The tape is shown as passing forwardly beneath the printer foot and over the type bar through a pair of rolls 127 and 128 to be presently described. The record tape or check tape as it may be termed, is movable at right angles to the tape carried by the roll 126 and is shown as mounted on a roll 129 carried between brackets 130. This tape also passes beneath the printer foot and over the type bar and is effectually wound on a roll 131 carried on the opposite side of the framework and mounted between bearing brackets 132. This latter roll is actuated to wind the tape up in the following manner. The shaft 116 is provided with an elliptically shaped cam such as is shown at 133, reference being here had particularly to Figs. 4, 5 and 9. This elliptic cam coöperates with a push rod 134 slidably mounted in a tie piece 110 forming the general supporting framework for the printing mechanism. The inside end of this push rod is provided with a collar 135 against which one end of a coil spring 136 operates, the opposite end of this spring abutting the framework 110. The outer end of the push rod 134 is pivotally connected to a link 137, this link pivoting about the shaft 138 on which the roll 131 is mounted, this shaft also carrying a ratchet wheel designated 139. A pawl 140 is designed to coöperate with this ratchet wheel and is, therefore, pivotally carried by the end of the push rod 134 and is normally held in engagement with the teeth of the ratchet by means of the leaf spring 141. Thus, each time the handle 36 is pushed down and returned again, the elliptic cam 133 will have operated the push rod 134 so that the ratchet wheel 139 will have been turned the desired extent to roll the paper from the roll 129 on to the roll 131 and thus successive weights may be recorded and saved as a record.

The manner of feeding the other tape, or that tape unwound from the roll 126 is as follows: Mechanism is provided whereby the two rolls 127 and 128 are rotated, these two rolls being in rigid clamping engagement with the tape fed from the roll 126. In addition, the roll 127 is provided with a knife 142, this knife coöperating with a suitably formed slot 143 in the roll 128 for severing the tape into desired lengths to form tickets. These rolls are mounted upon shafts 144 and 145 and are also geared together by means of the spur gears 146 and 147 so that rotation of one will cause rotation of the other. The manner in which the roll 127 is rotated is as follows: Reference to Fig. 1 will disclose that the shaft 35 upon which the handle 36 is mounted, carries an outwardly extending arm 148, this arm being pivotally connected with a link shown at 149. This latter link is also pivotally connected to a collar 150 adjustable by means of a set screw 151 upon an operating rod 152. This operating rod 152 is slidably journaled in the table structure 4 at its lower end and also slidably journaled in a bracket member designated 153, and shown as carried by the left hand side of the general framework supporting the printer mechanism. The upper end of this operating rod is formed with a series of teeth presenting a rack such as is shown at 154 in Fig. 6 especially, the teeth of this rack being designed to coöperate with the teeth of a spur pinion 155 loosely mounted upon a sleeve 156, which sleeve is loosely mounted on the left hand end of the shaft 144. The extreme left hand end of this shaft carries a shell 157, this shell being rigidly connected with the shaft as shown at 158. This shell carries a torsion spring 159, one end of this spring being rigidly attached to the sleeve as is shown at 160 and the opposite end of this spring being rigidly attached to the shell body as shown at 161. The gear 155 is provided with a disk portion 162 and upon this disk portion there is pivotally mounted a pawl 163, this pawl being designed for coöperation with an outwardly projecting shoulder 164 on the sleeve 156, this latter being more clearly shown in Fig. 7. Thus, when the handle 36 is moved to assume a horizontal position, the operating rod 152 is also moved downwardly and consequently the gear 155 is rotated. Because of this pawl connection with the sleeve 156, this sleeve is rotated and, therefore, the torsion spring 159 is wound because its opposite end is held against movement by the following structure. Particular reference to Figs. 5 and 7 will show that the shell 157 pivotally carries a dog 165, this dog being held in the position shown in Fig. 6 because of its engagement with the coils of the torsion spring 159 and in this position it engages a lug 166 depending from the bracket 153. In this manner then the torsion spring is wound by the movement of the handle 36 from the position shown in Fig. 1 to a horizontal position and during this winding operation the shaft 144 does not move. During the movement of the handle 36, as has just been related, the shaft 116 is also turned and this turns the cam 167 whose nose portion 168 strikes a pivoted finger 169 carried upon an arm 170. The arm 170 is pivoted to the printer mechanism framework as is shown at 171 and also carries a pin 172 so that the finger 169 is allowed a free pivotal movement in one direction and prevented a pivotal movement in the other direction. Thus, when the shaft 116 is given a left hand turn as it appears in Fig. 5, the finger 169 is free to swing, but upon the release of the handle 36, the shaft 116 is given a reverse movement and, therefore, the nose portion 168 rides the finger 169 to cause a swinging movement of the lever 170 about its pivot point 171. The left hand end of this lever 170 is, therefore, depressed and this lever is pivotally connected as shown at 173 to a release rod 174. This release rod is normally held in the position shown in Fig. 5 by means of the coil spring 175, but when the lever 170 is depressed, as shown, this release rod strikes the dog 165 and, therefore, also releases the torsion spring 159. The release of the dog 165, therefore, permits the shell 157 to rotate one revolution, since this shell is rigidly connected with the shaft 144 carrying the roll 147. This roll is also turned to feed out the ticket and sever the same to the desired length, as has already been related. In order to prevent the sleeve 156 from rotating when the dog 165 is released, I have provided the main framework of the printer mechanism with a dog 176, this dog being shown in Fig. 8 and being so arranged as to strike the shoulder 164 carried by the sleeve 156. Thus, the shaft 144 and shell 157 are the only two elements that can possibly rotate when the dog 165 is released and, therefore, the tape is fed forward and severed to ticket lengths.

A careful inspection of Fig. 5 will show that the relative arrangement of the hammer 120 and the nose 168 on the cam 167 is such that the printer foot is operated to record the weight before the ticket tape is given a movement. This figure will also show that the printer foot is given time to come out of engagement with the tape before the tape is fed forward.

From the foregoing description, taken in connection with the accompanying sheets of drawings, it will be apparent that I have provided a type of scale which is particularly adapted for automatically recording heavy weights, one adaptation for this scale being as I have already stated, the weighing of railroad cars and the like. By means of the peculiar type of switch mechanism, the direction of rotation of the motor controlling the counterpose is governed by the direction of tilt of the scale beam and this governing action is automatic. Also, particularly novel means have been provided whereby a weight may be recorded at the instant the scale beam is very slightly overbalanced or, in other words, at the instant it begins to tilt. As has been pointed out more specifically in the introductory portion, a scale beam is in true equilibrium when the counterpoise reaches the exact balance point and at this point, in the absence of any extraneous force, the scale beam may be made to assume any position of inclination or a horizontal position. A very slight further movement of the counter-balance weight causes the beam to drop, but this additional amount of movement of the counterpoise is so very slight that the instant the beam begins to tilt, can be considered as being the point of perfect balance. Also, if an extraneous force should be employed to cause a slight tilting of the beam before a balance point is reached, as may conveniently be done, the claims are to be properly interpreted with this in mind, since the essence of the present invention resides in a mechanism whereby the applied weight may be recorded at the instant the counterpoise passes over the balance point on the scale beam, this counter-balance being so controlled and so arranged that it may drift on and not be brought to rest at this balance point in order to record the weight. The spring construction shown at 102 and 103 is of such nature that a yielding connection is provided between the counterpoise and the type bar and this yielding connection is effective during the time that the printer foot is in engagement with this type bar. However, this time interval is very short and consequently the instant that the printer foot is withdrawn the counterpoise and its connecting mechanism may continue its movement on the scale beam due to its own inertia, provided, of course, that the scale is not again operated to run the counterpoise in a reverse direction. By this construction and arrangement, a great many weights can be recorded per unit of time and to an accuracy considered impossible heretofore. It will also be noted that the scale beam is locked at the end of each complete weighing operation, the weighing operation in the present instance being considered complete after the printed mechanism has been actuated and before the counterpoise has been brought to a standstill. Therefore, my scale starts from a locked position, makes and records a weight, and then finishes in a locked position.

What I claim, is:

1. A scale comprising a beam, a counterbalance weight movable on said beam, means for moving said weight back and forth on said beam, a weight indicating structure, means including a resilient connection actuated by the weight for setting said indicating structure in accordance with the positions of the weight upon said beam, and means under the control of said beam whereby said weight indicating structure is operated when said weight has reached a position, when moving in either a forward or backward direction, to overbalance said beam, said resilient connection serving to permit of the operation of said indicating structure without necessarily bringing said weight to a rest.

2. A scale comprising a beam, a counterbalance weight movable on said beam, means for moving said weight back and forth on said beam, means for recording a weight measurement, means including a resilient connection actuated by the weight for setting said recording means to correspond with the position of the weight on the beam, and means under control of said beam whereby said recording means is operated at the time when said beam has reached an equilibration state due to the influence of said weight when moving either forward or backward to such position, said resilient connection serving to permit of the operation of said recording means without necessarily bringing said weight to a dead stop at the equilibration point.

3. A scale comprising a beam, a counterbalance weight movable on said beam, a motor for moving said weight back and forth on said beam, a switch for governing the direction of rotation of said motor, said switch being operated by the tilting of said beam, and electromagnetic means for holding said switch closed as long as the beam remains tilted.

4. A scale comprising a beam, a counterbalance weight movable on said beam, means for moving said weight back and forth on said beam, means for recording a weight measurement, means actuated by the weight for setting said recording means to correspond with the position of the weight on the beam, and means whereby said recording means is operated at the instant said beam is overbalanced to move toward horizontal position by a movement of the weight in either a forward or backward direction and without waiting for the beam to assume a horizontal equilibration state.

5. A scale comprising a beam, a counterbalance weight movable on said beam, means for moving said weight back and forth on said beam, weight recording mechanism, means actuated by the movement of the weight for setting said mechanism to correspond with the position of the weight on the beam, and means whereby said mechanism is operated when said weight has reached a balance point on said beam in either a forward or backward direction of movement to record the weight, and a resilient connection between said weight and recording means, said connection being operable to allow said weight to continue its movement after the balance point has been reached without altering the correct weight indication.

6. A scale comprising a beam a counterbalance weight movable on said beam, means for moving said weight back and forth on said beam, weight recording mechanism, means actuated by said weight for setting said mechanism to correspond with the position of the weight on the beam means whereby said mechanism is operated by the tilting of the beam when said weight has reached the balance point on said beam in either a forward or backward direction of movement to record the weight, and a connection between said weight and said setting means to allow said weight to continue its movement after the balance point has been reached without altering the correct weight indication.

7. A scale comprising a beam, a counterbalance weight movable on said beam, means for moving said weight back and forth on said beam, weight recording mechanism, an operative connection between said weight and said mechanism, and actuating means for said mechanism operated by the tilting of said beam toward a horizontal balancing position by the movement thereon of said weight in either a forward or backward direction, said connection being such that the correct weight will be recorded without actually stopping said weight in its movement.

8. A scale comprising a beam, a counterbalance weight movable on said beam, means for moving said weight back and forth on said beam, weight recording mechanism, a connector structure between said mechanism and said weight, and a yielding connection forming a portion of said connector.

9. A scale comprising a beam, a counterbalance weight movable on said beam, means for moving said weight back and forth on said beam, weight recording mechanism mounted stationary with regard to the movement of said weight and set said last named means, and means permitting said recording mechanism to operate without bringing said weight to a dead stop.

10. A scale comprising a beam, a counterbalance weight movable on said beam, means for moving said weight back and forth on said beam, weight recording mechanism including a type bar movable back and forth with said weight, a yielding connection operating between said type bar and said weight, and actuating means for said mechanism for taking an impression from said bar as said weight moves on said beam at the balance point.

11. A scale comprising a beam, a counterbalance weight movable on said beam, means for moving said weight back and forth on said beam, weight recording mechanism including a type bar movable back and forth with said weight, a yielding connection operating between said type bar and said weight, means actuated by the tilting of the beam toward horizontal balancing position for temporarily holding the bars stationary while the weight continues its movement, and actuating means for taking an impression from said type bar when it is thus clamped.

12. A scale comprising a beam, a counterbalance weight movable on said beam, motor means for moving said weight back and forth on said beam, a double throw switch operated by the tilting of said beam to govern the direction of rotation of said motor, electric connections between said motor and said switch, electro-magnets for holding said switch in either closed position and contact means arranged to break the circuit through said motor and said magnets by the tilting of said beam toward horizontal balancing position.

13. A scale comprising a beam, a counterbalance weight movable on said beam, means for moving said weight back and forth on said beam, weight recording mechanism including an element having a series of wedge shaped teeth, said mechanism including a clamp device formed with complemental wedge-shaped teeth, and a yielding connection operating between said weight and said mechanism.

14. A scale comprising a beam, a counterbalance weight movable on said beam, means for moving said weight back and forth on said beam, weight recording mechanism including a type bar movable back and forth with said weight, a series of wedge pointed teeth formed on said bar, said mechanism including a clamp device formed with complemental wedge pointed teeth for coöperation with said first-named teeth, and a yielding connection operating between said weight and said bar.

15. A scale comprising a beam, a counterbalance weight movable on said beam, means for moving said weight back and forth on said beam, and weight recording mechanism comprising a type structure movable synchronously with said weight, a printer foot arranged to coöperate with said type structure, said printer foot being formed in sections, and connecting means permitting a slight relative movement between said sections when said foot is brought into engagement with said type structure.

16. A scale comprising a beam, a counterbalance weight movable on said beam, means for moving said weight in either direction on said beam toward the balance point, a recording mechanism coöperative with said weight and capable of being set in accordance with the position of the weight on said beam, and means for recording the weight as determined by the position of said weight on said beam at the instant the balance point is reached when said weight is moving in either a forward or backward direction, the connection between said recording mechanism and said weight being sufficiently yieldable to afford a correct indication without stopping the counter-balance weight in its movement.

17. A scale comprising a beam, a counterbalance weight movable on said beam, means for moving said weight in either direction on said beam toward the balance point, and means for recording the weight as determined by the position of said counter-balance weight on said beam at the instant the balance point is reached when said weight is moving in either a forward or backward direction without stopping the counter-balance weight in its movement.

18. A scale comprising a beam, a counterbalance weight movable on said beam, a motor for moving said weight back and forth on said beam, and a double throw switch operated by the operating of the beam to govern the direction of rotation of said motor comprising a pivotally supported arm structure, contacts carried by said arm structure on one side of its pivot point, a plurality of complemental contacts arranged to coöperate with said first-named contacts, electric connections between said contacts and said motor, counter-balance means carried by said arm structure to maintain an even balance about its pivot point, and supplemental means effective to overbalance said arm on either side of its neutral position, said complemental contacts being arranged on the opposite sides of said arm structure and connected to reverse the direction of flow of the current through said motor.

19. A scale comprising a beam, a counterbalance weight movable on said beam, a motor for moving said weight back and forth on said beam, and an electric switch operated by the tilting of said beam comprising a horizontally arranged pivotally supported arm structure, contacts carried by said arm structure on one side of its pivot point, complemental contacts arranged on opposite sides of said arm structure to coöperate with said first named contacts, electric connections between said contacts and said motor a horizontally adjustable counter-balance means carried by said arm structure to maintain it in even balance about its pivot point, and supplemental weight means swingable with and carried by said arm above its pivot point and disposed to be in vertical alinement with said pivot point when said arm structure is in horizontal position, said complemental contacts being arranged to reverse the direction of flow of the current through said motor.

20. A scale comprising a beam, a counterbalance weight movable on said beam, a motor for moving said weight back and forth on said beam, and a double-throw switch operated by the tilting of the beam comprising a horizontally arranged pivotally supported arm structure, said arm structure being evenly balanced, a plurality of contacts carried by said arm structure on one side of its pivot point, a plurality of complemental contacts arranged to coöperate with said first named contacts to reverse the direction of flow of current through said motor, electric connections between said contacts and said motor, and means ineffective when said arm structure is in true horizontal position, but effective when said arm structure is operated in either direction to overbalance said arm structure.

21. A scale comprising a beam, a counterbalance weight movable on said beam, a motor for moving said weight back and forth on said beam, and a double-throw switch operated by the tilting of the beam comprising a horizontally arranged pivotally supported arm structure, said arm structure being evenly balanced, a plurality of contacts carried by said arm structure on one side of its pivot point, a plurality of complemental contacts arranged to coöperate with said first named contacts to reverse the direction of flow of current through said motor, electric connections between said contacts and said motor, means ineffective when said arm structure is in true horizontal position, but effective when said arm structure is operated in either direction to overbalance said arm structure, an armature structure carried by said arm structure, and a pair of magnets arranged to coöperate with said armature structure.

In testimony whereof I affix my signature in presence of two witnesses.

W. STANDISH SMITH.

Witnesses:
L. R. DRAKE,
WALTER E. S. BOCK.